United States Patent
Saliba et al.

(10) Patent No.: US 6,729,825 B1
(45) Date of Patent: May 4, 2004

(54) STORAGE MEDIUM CARTRIDGE FOR USE WITH A STORAGE MEDIUM CARTRIDGE GRIPPING ASSEMBLY

(75) Inventors: George Saliba, Northboro, MA (US); Satya Mallick, Milford, MA (US); Peter Tabur, Framington, MA (US)

(73) Assignee: Quantum Corporation, Milpitas, CA (US)

(*) Notice: Subject to any disclaimer, the term of this patent is extended or adjusted under 35 U.S.C. 154(b) by 0 days.

(21) Appl. No.: 09/266,396

(22) Filed: Mar. 11, 1999

(51) Int. Cl.⁷ .............................................. B25J 15/00
(52) U.S. Cl. ........................ 414/280; 414/908; 294/96; 294/97
(58) Field of Search ................................ 414/277, 280, 414/281, 282, 283, 908, 910; 360/92; 294/93, 94, 96, 88, 86.24, 86.25, 103.1, 86.15, 97

(56) References Cited

U.S. PATENT DOCUMENTS

| | | | | |
|---|---|---|---|---|
| 832,364 A | * | 10/1906 | Burton | 294/94 |
| 1,457,596 A | * | 6/1923 | Nutter | 294/96 |
| 1,815,462 A | * | 7/1931 | Denney | 294/86.15 |
| 2,249,585 A | * | 7/1941 | Thomure | 294/96 |
| 2,563,675 A | * | 8/1951 | Edwards | 294/96 |
| 2,563,993 A | * | 8/1951 | De Lancey | 294/94 |
| 3,715,040 A | * | 2/1973 | Polus et al. | 414/280 X |
| 4,815,055 A | * | 3/1989 | Fago, Jr. | 369/36 |
| 5,163,802 A | * | 11/1992 | Poinelli | 414/555 |
| 5,195,794 A | * | 3/1993 | Hummel et al. | 294/94 |
| 5,237,467 A | * | 8/1993 | Marlowe | 360/92 |
| 5,277,534 A | * | 1/1994 | Anderson et al. | 414/280 X |
| 5,501,515 A | * | 3/1996 | Dalziel | 414/280 X |
| 5,503,446 A | * | 4/1996 | De Jong | 294/94 |
| 5,562,384 A | * | 10/1996 | Alvite et al. | 221/88 X |
| 5,610,882 A | | 3/1997 | Dang | |
| 5,631,785 A | | 5/1997 | Dang et al. | |
| 5,659,444 A | | 8/1997 | Dang et al. | |
| 5,669,652 A | * | 9/1997 | Reising et al. | 294/88 |
| 5,691,859 A | | 11/1997 | Ulrich et al. | |
| 5,713,618 A | * | 2/1998 | Kocsis | 294/93 |
| 5,715,216 A | | 2/1998 | Dang et al. | |
| 5,718,339 A | | 2/1998 | Woodruff | |
| 5,731,926 A | | 3/1998 | Gallo et al. | |
| 5,740,061 A | | 4/1998 | Dewey et al. | |
| 5,746,464 A | | 5/1998 | Paul | |
| 5,752,668 A | | 5/1998 | Patterson et al. | |
| 5,761,161 A | | 6/1998 | Gallo et al. | |
| 5,768,047 A | | 6/1998 | Ulrich et al. | |
| 5,791,712 A | * | 8/1998 | Hawn | 294/86.15 |
| 5,820,055 A | | 10/1998 | Leger et al. | |
| 5,848,872 A | * | 12/1998 | Manes et al. | 414/280 |
| 5,873,692 A | * | 2/1999 | Costas | 414/796.9 |
| 6,111,847 A | * | 8/2000 | Assadian | 369/30.55 |
| 6,385,003 B1 | * | 5/2002 | Ellis | 360/92 |

* cited by examiner

*Primary Examiner*—James W. Keenan
(74) *Attorney, Agent, or Firm*—James P. Broder; Steven G. Roeder (57) ABSTRACT

A storage medium cartridge that has a substantially rectangular housing with an aperture formed thereon is provided for use with a cartridge gripping assembly. The cartridge gripping assembly includes a gripping mechanism having a first end which releasably engages the aperture defined on the housing of the storage medium cartridge. The gripping mechanism further includes a second end that is dimensioned for coupling with a first end of a mechanized robotic arm for providing motion to the cartridge gripping assembly.

35 Claims, 7 Drawing Sheets

STORAGE MEDIUM CARTRIDGE FOR USE WITH A STORAGE MEDIUM CARTRIDGE GRIPPING ASSEMBLY

FIELD OF THE INVENTION

The invention relates generally to a storage medium cartridge transport mechanism and more precisely to a storage medium cartridge adapted to cooperate with a storage medium cartridge gripping assembly.

BACKGROUND OF THE INVENTION

Storage medium cartridges, such as tape cartridges or magneto-optical cartridges, have proven to be an efficient and effective means for storing data. Storage medium libraries utilize a plurality of storage medium cartridges as well as a number of storage medium drives for writing and reading data to or from the cartridges. The storage medium drives, for example, can be magnetic tape drives, magneto-optical drives, or a combination of both.

Storage medium cartridges employed within a library system are typically positioned within a number of removable cartridge magazines. Each magazine includes a plurality of magazine slots which contain the cartridges. The magazines are arranged within the library system to form an array of storage medium cartridges. Storage medium drives employed within the library system are generally positioned opposite the array of storage medium cartridges. A cartridge transport mechanism positioned between the array of cartridges and the drives moves the cartridges back and forth between the drives and the slots defined on the cartridge magazines.

The cartridge transport mechanism generally includes a cartridge gripper assembly positioned on an elevator mechanism. Typical cartridge gripper assemblies include a pair of cartridge gripping fingers that engage and securely hold a cartridge during transport. One example of a conventional cartridge gripper assembly that includes a pair of gripping fingers is shown in U.S. Pat. No. 5,691,859. This patent discloses a cartridge gripper assembly for moving a selected data cartridge between a tape drive and a tape cartridge magazine. The front bezel of the magnetic tape drive has both a gripper-tripping projection and two gripper spreading cam members. The two cam members cause the pair of gripper fingers of the cartridge gripper to spread apart when the gripper assembly travels toward the bezel. The gripper tripping projection abuts and snaps closed finger linkages which close the gripper fingers of the gripper assembly when the gripper assembly engages a cartridge. A pair of notches, formed on the exterior surface of the cartridge housing where the gripper fingers engage the cartridge, form a non-slip contact surface for the gripper fingers. In transporting a cartridge from a tape drive to a slot in the cartridge magazine, the elevator containing the gripping assembly is positioned adjacent to the drive containing the tape cartridge. The gripping mechanism moves toward the drive, actuating the gripping assembly, and causing the gripping assembly to engage the cartridge. The gripper fingers engage with the notches defined on the cartridge surface. The gripper assembly then moves away from the drive to extract the cartridge from the tape drive. The elevator mechanism containing the gripper assembly and cartridge is then moved to a position adjacent to the selected magazine slot. The gripping assembly and the cartridge then move into the magazine slot. At this point, a plunger defined on the gripping assembly is actuated as the cartridge inserts into the magazine slot and the cartridge is released.

One problem with the above described cartridge gripper, as well as with other similarly designed grippers, is that the gripper itself must be actuated by the gripper spreading cams and gripper-tripping projection defined on the front bezel of the tape drive. This gripper mechanism cannot be employed in tape library systems whose tape drives do not have these gripper spreading cams and gripper-tripping projection. Additionally, storage medium cartridges can have a substantially convex frontal portion that is not receptive to being engaged by the two-finger gripper as described above. When the convex frontal portion of a cartridge engages the two-finger gripper, the gripper fingers can snap on to the cartridge without engaging the pair of notches defined on the cartridge. As a result, the two-finger gripper can drop the cartridge.

Another drawback of the above described cartridge gripper assembly is that it requires numerous parts and is relatively complex and difficult to assemble.

Thus, a hitherto unsolved need has remained for a cartridge gripper assembly that can be employed within a storage medium library for moving cartridges that does not require gripper spreading cams and gripper-tripping projections.

SUMMARY OF THE INVENTION

A first embodiment of the present invention comprises both a storage medium cartridge that is adapted for use with a cartridge gripping assembly and a cartridge gripping assembly.

The storage medium cartridge includes a substantially rectangular housing having an aperture formed on the exterior of the housing. The aperture is dimensioned to be receptive to a cartridge gripping assembly. The cartridge gripping assembly includes a cartridge gripping mechanism. The cartridge gripping mechanism includes a first end and a second end. The first end of the gripping mechanism is dimensioned to engage the aperture defined on the cartridge and the second end of the gripping mechanism is dimensioned for coupling with a first end of a robotic arm. The first end of the gripping mechanism includes first and second ramped portions. The first ramped portion is defined on a first plane and the second ramped portion is defined on a second plane, where the first plane and the second plane are parallel with respect to each other. The second ramped portion is positioned directly over and is integral with the first ramped portion. However the second ramped portion has a narrower crosswise or transverse width than the first ramped portion. The longitudinal edges of the second ramped portion are undercut such as to form a pair of longitudinal grooves between the longitudinal edges of the second ramped portion and the planar surface of the first ramped portion.

The gripping mechanism further includes a central arm having a first end and a second end. The first end is pivotably connected to a slide portion via a hinge. The slide portion is a wedge shaped component that is dimensioned to slidably engage the grooves formed on the first and second ramped portions. The second end of the central arm is coupled to an actuation means via another hinge. One preferred actuation means is an air cylinder. Actuating the air cylinder results in the central arm moving back and forth along a longitudinal axis, where such motion is further translated to the slide portion for moving the slide portion up and down the ramped portions.

During operation, the first end of the gripping mechanism is positioned in the aperture defined on the storage medium cartridge. Then the actuation means associated with the gripping mechanism is actuated to move the front edge of the slide portion from a first position defined at the bottom region of the ramped portions to a second position defined at the top region of the ramped portions. In moving the front edge of the slide portion from the first position to the second position, the effective height of the combination of the ramped portions and the slide portion increases. This expansion of the ramped portions and slide portion presses the combination against the inner circumferential walls of the aperture and frictionally secures the cartridge to the gripping mechanism. Reversing the actuation means allows the slide portion to return back to its original position and disengages the cartridge engagement mechanism from the aperture and releases the cartridge.

These and advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 7 (B) is another greatly expanded and enlarged view of a portion of the FIG. 6 cartridge gripping assembly;

DETAILED DESCRIPTION OF A PREFERRED EMBODIMENT

Figure 1:
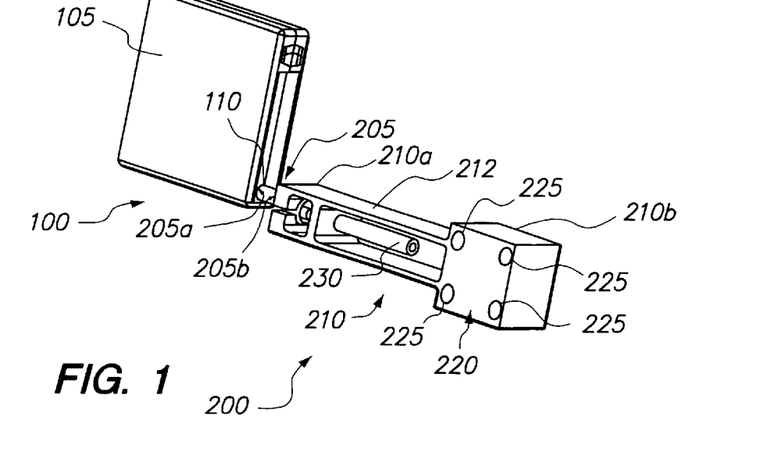
FIG. 1 shows a first embodiment of the present invention comprising a storage medium cartridge and a storage medium cartridge gripping assembly.

Referring to FIG. 1, one preferred embodiment of the present invention set forth herein is a storage medium cartridge 100 adapted to cooperate with a cartridge gripping assembly 200 having principles of the present invention. Generally, storage medium cartridge 100 includes a substantially rectangular housing 105 having an aperture 110 formed thereon. Aperture 110 is dimensioned and positioned on cartridge housing 105 to facilitate engagement with cartridge gripping assembly 200 as shown in FIG. 1.

Cartridge gripping assembly 200 generally includes a gripping mechanism 205 having a first end 205a which can engage aperture 110. Gripping mechanism 205 further includes a second end 205b that couples to first end 210a of robotic arm 210. Second end 210b of robotic arm 210 couples to an actuation means, such as pivotal actuation member 332 (see FIG. 12).

Figure 2:
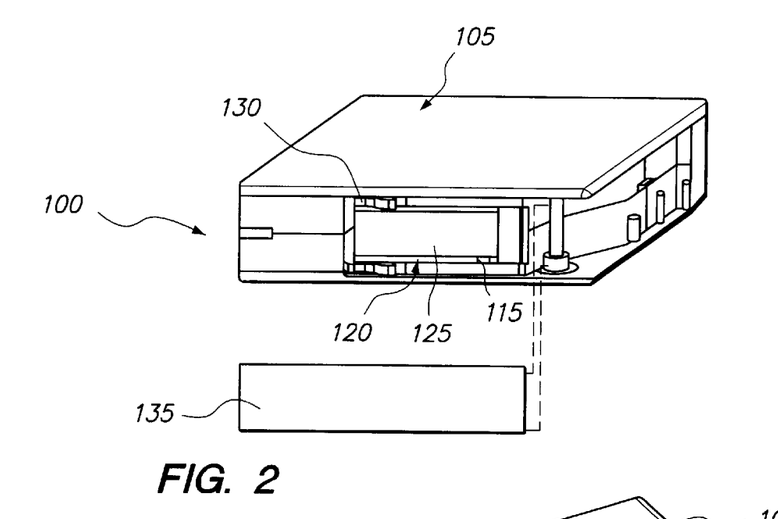
FIG. 2 is a frontal view of the storage medium cartridge shown in FIG. 1.

Referring to FIG. 2, storage medium cartridge 100 includes a substantially rectangular housing 105 with a hollow interior portion 115. Storage medium cartridge 100 further includes an information storage medium, such as magnetic tape 120, rotatably contained within cartridge housing 105. Alternatively, a magneto-optical storage disk (not shown) can be substituted for magnetic tape 120 to form a different type of storage medium cartridge (not shown). Storage medium cartridge 100 is herein redefined as magnetic tape cartridge 100, as it holds magnetic tape 120.

Magnetic tape cartridge 100 further includes a pivotal door 135. Pivotal door 135 includes a locking mechanism (not shown) to maintain door 135 in a locked position when tape cartridge 100 is not in use.

Figure 3:
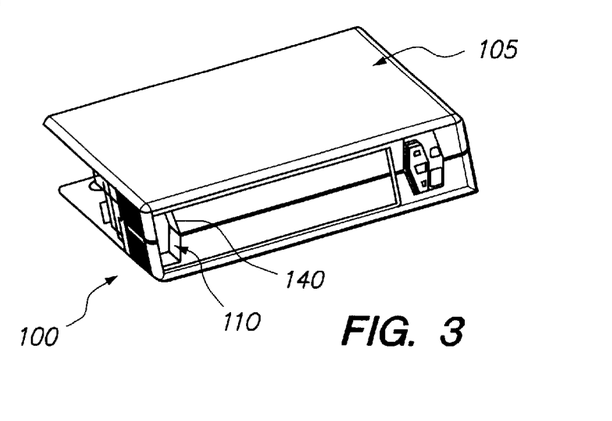
FIG. 3 is a rear view of the storage medium cartridge shown in FIG. 1.
Figure 4A:
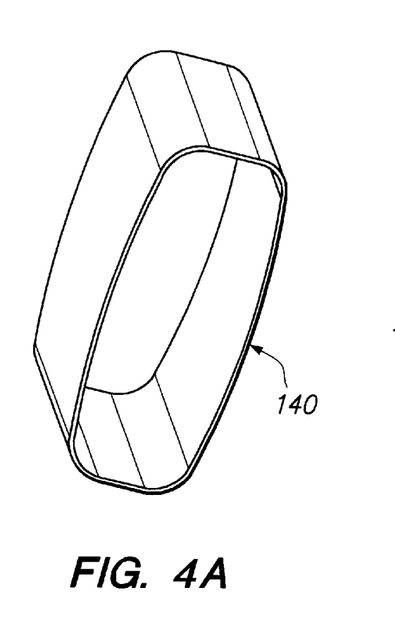
FIG. 4(A) is a support ring used in the first embodiment of the present invention.
Figure 4B:
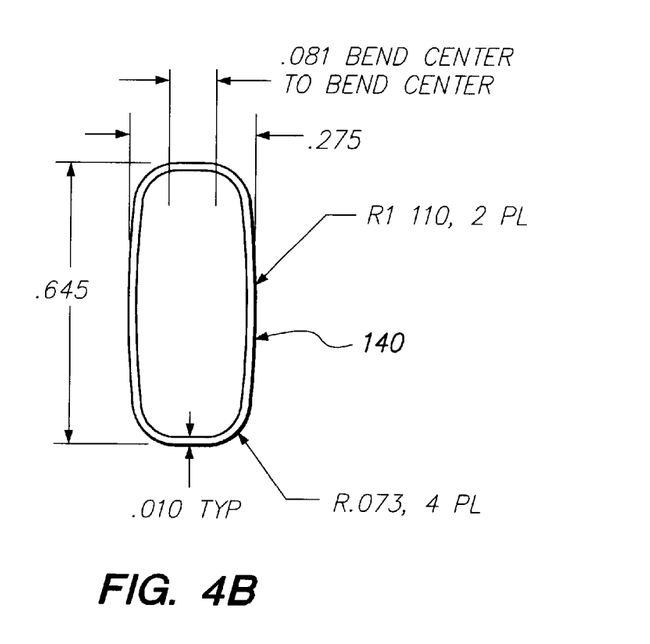
FIG. 4(B) is one preferred set of dimensions for the FIG. 4(A) support ring.

Referring to FIG. 3, the rear portion of magnetic tape cartridge 100 includes a substantially rectangular aperture 110 that is receptive to cartridge gripping mechanism 205. Aperture 110 can be shaped in any one of numerous geometries, including a rectangle, circle, or oval. Preferably, aperture 110 is reinforced with a support ring 140. Specifically and more precisely shown in FIG. 4(A), support ring 140 is a relatively rigid ring dimensioned to fit into aperture 110. Support ring 140 is dimensioned to substantially conform to the interior circumferential walls of aperture 110. One preferred set of dimensions for support ring 140 is set forth in FIG. 4(B). Support ring 140 can be fixed in aperture 110 by press fitting or, alternatively, support ring 140 can be fixed in position by a suitable adhesive such as epoxy resin or the like. Although not shown in FIG. 4, support ring 140 can further have barbed prongs that engage the inner walls of aperture 110. Support ring 140 can be comprised of any one of numerous materials that provide rigid strength, but are still receptive to bending and shaping. One preferred material for support ring 140 is stainless steel. Other preferred materials include aluminum, metal alloys, or rigid polymer plastics.

Figure 5:
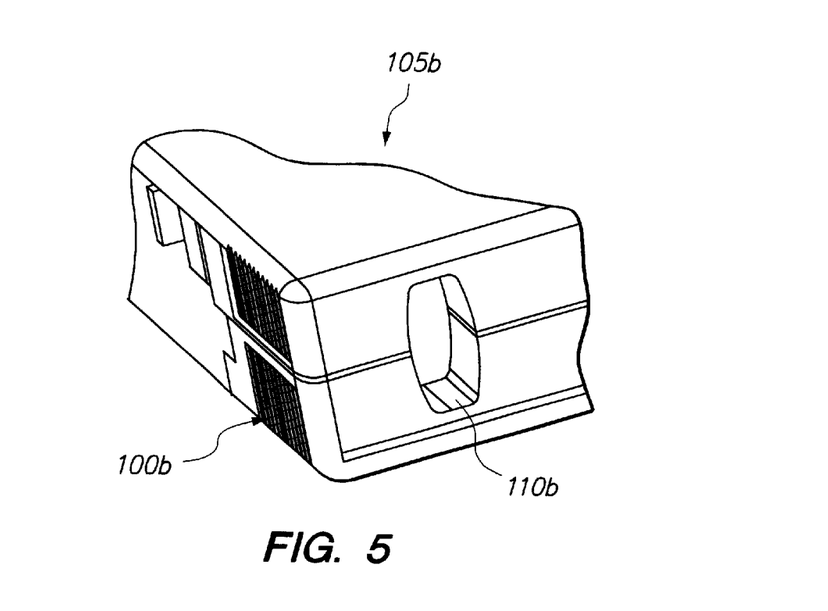
FIG. 5 is a partial and enlarged view of another storage medium cartridge having principles of the present invention.

Referring to FIG. 5, cartridge 100b illustrates an alternate form of cartridge 100 (FIG. 3). In this alternate form, support ring 140 is not required, provided that the material of cartridge housing 105b of cartridge 100b can withstand the radial engagement forces exerted thereon by cartridge gripping assembly 200 during use. One typical material for fabricating cartridge 100b to withstand such engagement forces, without use of support ring 140, is a polycarbonate.

Figure 6:
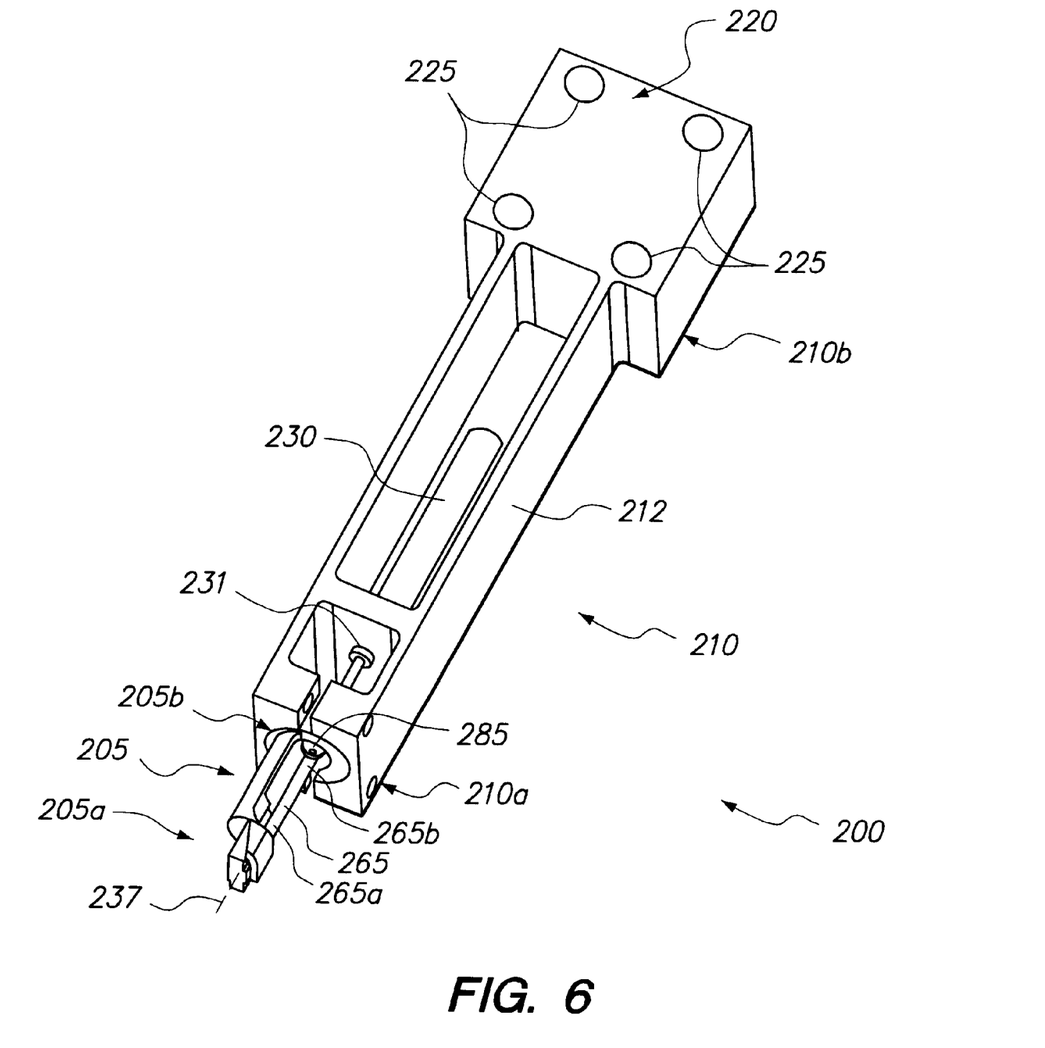
FIG. 6 is an isometric view of the storage medium cartridge gripping assembly shown in FIG. 1.
Figure 11:
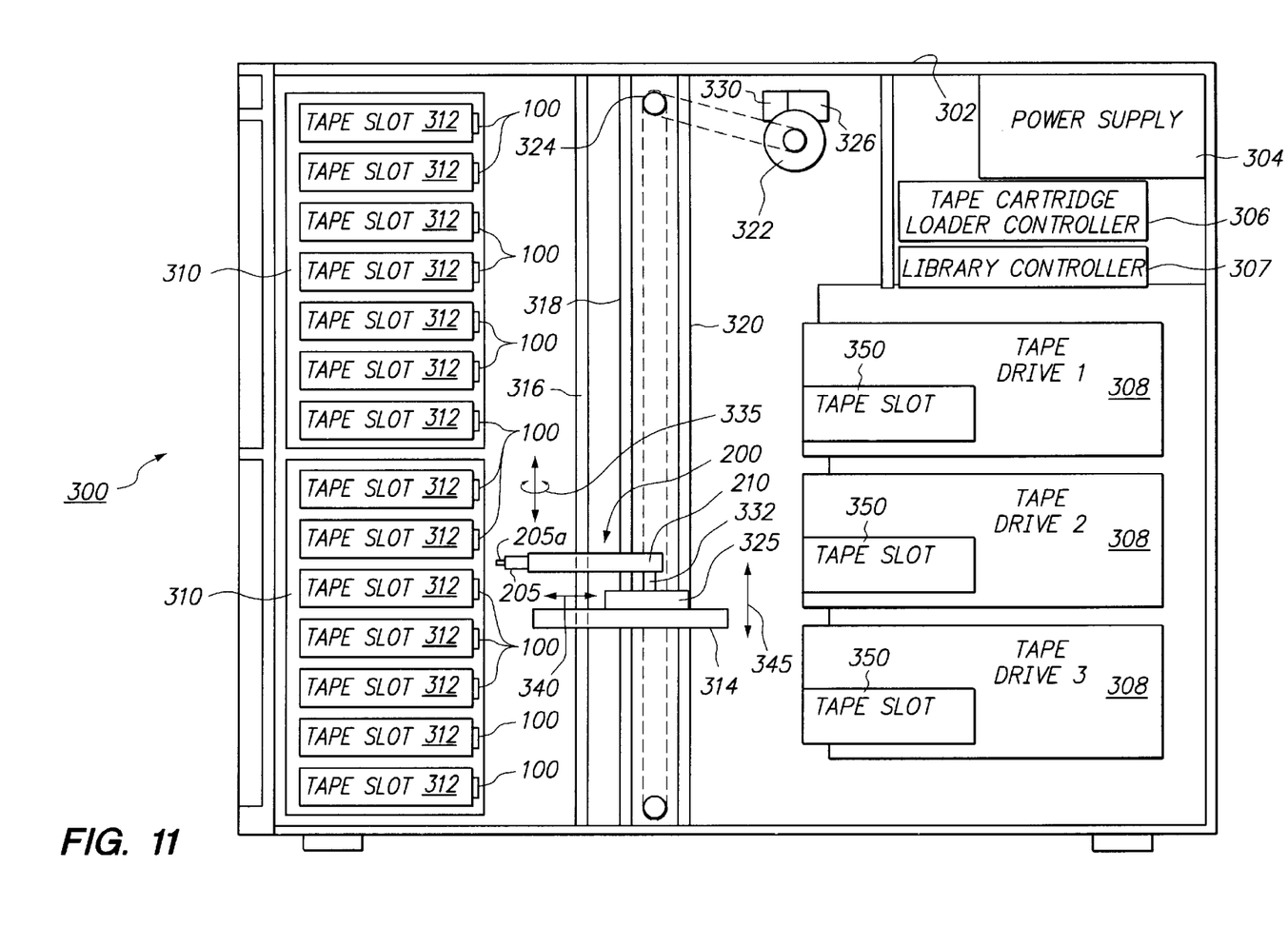
FIG. 11 illustrates a tape library system having principles of the present invention.

Referring to FIG. 6, cartridge gripping assembly 200 generally includes a cartridge gripping mechanism 205 having a longitudinal axis 237 extending from first end 205a of gripping mechanism 205 to second end 205b of gripping mechanism 205. First end 205a of gripping mechanism 205 engages aperture 110 (FIG. 3). Second end 205b of gripping mechanism 205 couples with first end 210a of robotic arm 210. Robotic arm 210 comprises an elongated arm 212 with first end 210a coupled to gripping mechanism 205 and second end 210b comprising a mounting block structure 220 dimensioned for coupling with a pivotal actuation member 332 (FIG. 11). Mounting block structure 220 includes a number of bores 225 formed thereon to facilitate mounting robotic arm 210 to pivotal actuation member 332. Robotic arm 210 further includes an actuation means 230 that cooperates with cartridge gripping mechanism 205 to actuate first end 205a of gripping mechanism 205 when gripping mechanism 205 is in position to engage a cartridge 100.

Referring to FIGS. 7A, 7B, 8A, 8B, and 8C collectively, gripping mechanism 205 comprises first component 235 positioned on longitudinal axis 237. First component 235, includes first and second ramped portions 240 and 245, respectively, at first end 205a of gripping mechanism 205. First ramped portion 240 is centered on longitudinal axis 237 and is inclined at a predetermined angle (Ø) from axis 237. Further, first ramped portion 240 is dimensioned to have a crosswise or transverse width that substantially defines the width of cartridge gripping mechanism 205.

Second ramped portion 245 is also centered on longitudinal axis 237 and is parallel to first ramped portion 240. Second ramped portion 245, however, is dimensioned to have a transverse width that is substantially narrower than the width of first ramped portion 240. Longitudinal edges 250 of second ramped portion 245 are undercut such that a pair of longitudinal grooves 255 are formed between longitudinal edges 250 of second ramped portion 245 and a planar surface of first ramped portion 240.

Figure 9A:
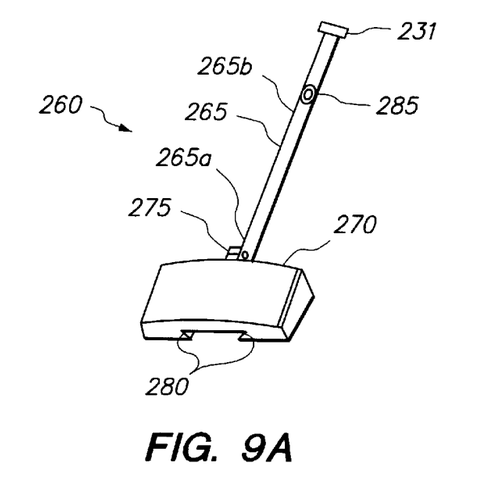
FIG. 9(A) is a view of a second component part of the FIG. 6 cartridge gripping assembly.
Figure 9B:
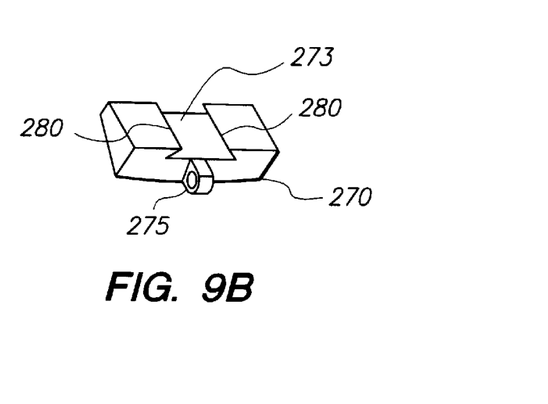
FIG. 9(B) is a bottom view of a portion of the FIG. 9(A) second component part.

Referring further to FIGS. 9A and 9B cartridge gripping mechanism 205 further includes a second component 260. Second component 260 includes a central arm 265 having a first end 265a and a second end 265b. First end 265a is pivotably attached to a wedge shaped slide component 270 via a hinge 275 (best shown in FIG. 9A). Slide component 270 includes a ramped interior portion 273 and a pair of longitudinal rails 280. Longitudinal rails 280 are dimensioned to slidably engage with grooves 255 of first component 235, enabling slide component 270 to slide up and down first 240 and second 245 ramped portions defined on first component 235.

Second component 260 of cartridge gripping mechanism 205 further includes plunger 231 that cooperates with actuation means 230 (see FIG. 6). Plunger 231 is pivotably connected to second end 265b of central arm 265 via hinge 285. Actuation means 230 may be an air cylinder that longitudinally actuates plunger 231, which plunger 231 is connected to second end 265b of central arm 265 for moving central arm 265 back and forth along longitudinal axis 237. The longitudinal motion of central arm 265 is translated to slide component 270, which slides up and down ramped portions 240 and 245. Alternative actuation means include solenoids, hydraulic cylinders, etc.

Figure 7A:
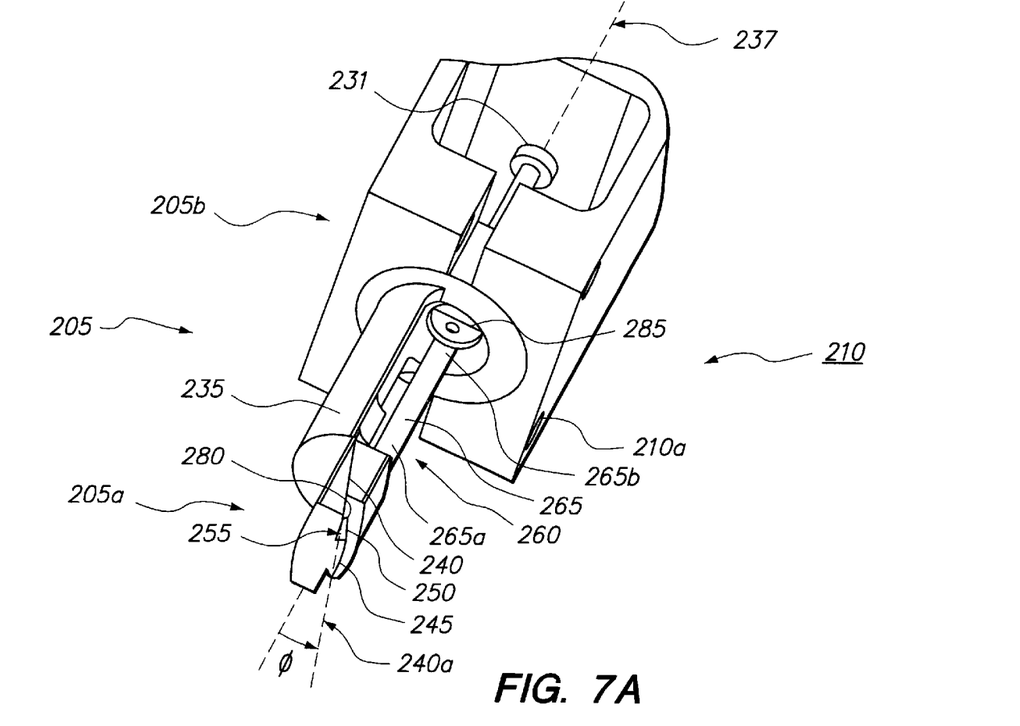
FIG. 7(A) is a greatly expanded and enlarged view of a portion of the FIG. 6 cartridge gripping assembly.
Figure 7B:
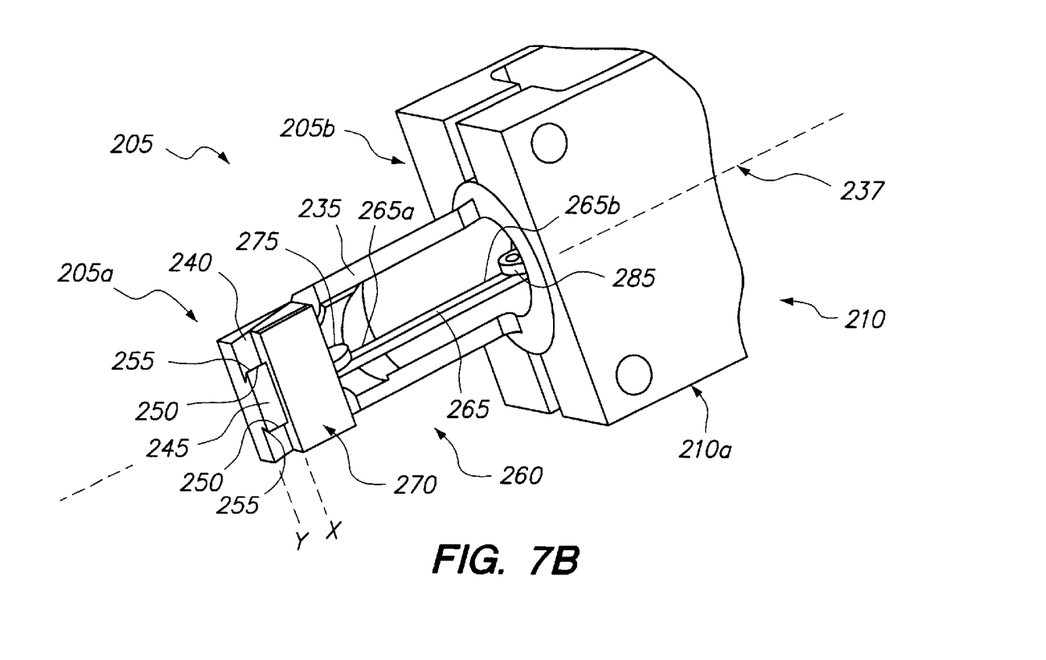
Figures 8A, 8B:
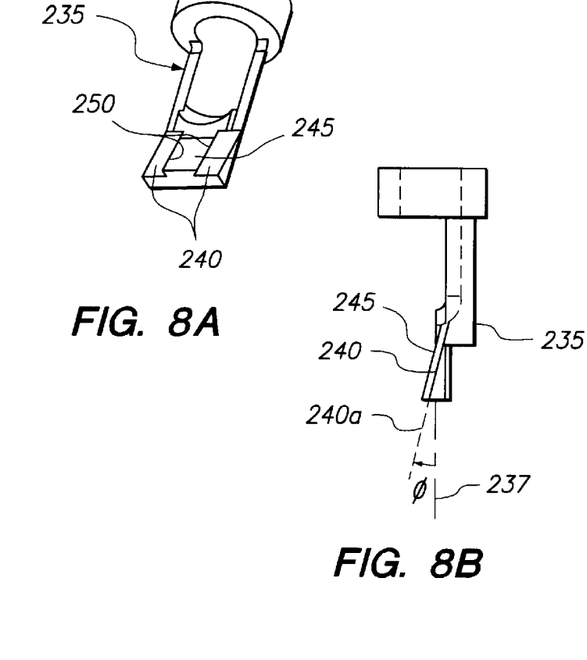
FIG. 8(A) is an isometric view of a first component part of the FIG. 6 cartridge gripping assembly.
FIG. 8(B) is a side plan view of the FIG. 8(A) first component part.
Figure 8C:
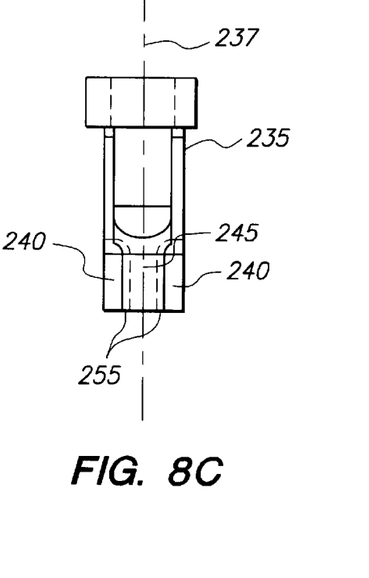
FIG. 8(C) is a top plan view of the FIG. 8(A) first component part.

Referring to FIG. 7B, moving the front edge of slide component 270 from a first position X defined at a bottom region of ramped portions 240 and 245 to a second position Y defined at a top region of ramped portions 240 and 245 results in an increase in height of first end 205a of gripping mechanism 205. Conversely, moving slide component 270 from second position Y back to first position X, results in a decrease in height of first end 205a of gripping mechanism 205.

In operation, first end 205a of cartridge gripping mechanism 205 is inserted into aperture 110 of cartridge 100. While first end 205a of gripping mechanism 205 is positioned in aperture 110, actuation means 230 associated with gripping mechanism 205 is actuated to move the front edge of slide component 270 from first position X defined at the bottom region of ramped portions 240 and 245 to second position Y defined at the top region of ramped portions 240 and 245. This transition of the front edge of slide component 270 from first position X to second position Y results in an increase in height of first end 205a of gripping mechanism 205. In this manner, first end 205a of gripping mechanism 205 engages the inner circumferential walls of aperture 110 and frictionally secures storage medium cartridge 100 to cartridge gripping mechanism 205. In order to release cartridge 100, actuation means 230 is reversed and slide component 270 is moved to position X defined at the bottom region of ramped portions 240 and 245. When the front edge of slide portion 270 is moved to position X, first end 205a of gripping mechanism 205 decreases in height. As a result, first end 205a of gripping mechanism 205 disengages from aperture 110 and cartridge 100 is released.

Figure 10:
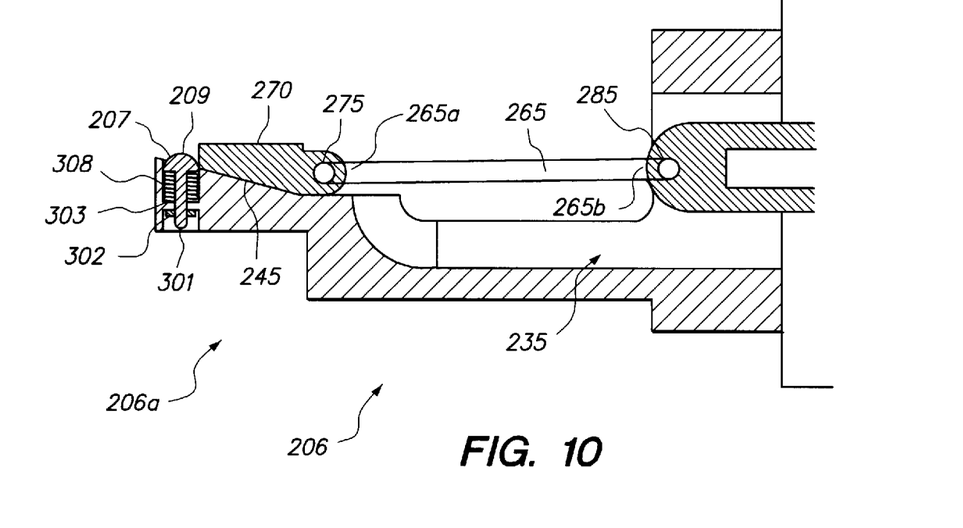
FIG. 10 illustrates a cross-sectional view of an alternate embodiment of the cartridge gripping assembly.

FIG. 10 is a cross-sectional view of an alternate embodiment of cartridge gripping mechanism 205 (FIG. 7). Elements which remain essentially unchanged from the previously discussed FIGS. 7–9 are assigned the same reference numerals. Cartridge gripping mechanism 206 is essentially the same as previously shown gripping mechanism 205. However, second ramped portion 245 further includes a central collet 207 having a predetermined diameter and depth. A central bore 302 is formed on the bottom region of collet 207 and central bore 302 extends through gripping mechanism 206. Central bore 302 has a smaller diameter than collet 207 so that a small ridge 303 is formed between the bottom region of collet 207 and central bore 302. A spring loaded pin 208 is positioned in collet 207 so that one end of the spring rests on ridge 303 and another end of the spring preloads a first end of pin 209, which protrudes above a planar surface of second ramped portion 245. A second end 301 of spring loaded pin 208 is positioned in central bore 302.

During operation, slide portion 270 engages first end 209 of pin 208 pressing first end 209 flush with second ramped portion 245, which forces second end 301 of pin 208 to extend outwardly from gripping mechanism 206. When end 206a of engagement mechanism 206 is positioned in a cartridge aperture 110 (FIG. 3), this outwardly extending second end 301 of pin 208 engages a receptive bore (not shown) formed on the inner wall of aperture 110 and/or support ring 140 (FIG. 3), positively securing cartridge 105 (FIG. 3) to gripping mechanism 206.

Referring to FIG. 11, the present invention is particularly useful within the environment of a tape library system 300. Tape library 300 system, comprises a housing 302, a power supply 304, a tape cartridge loader controller 306, a library controller 307, a plurality of tape drives 308, a number of tape cartridge magazines 310, magazines 310 having a plurality of tape slots 312 containing tape cartridges 100, cartridges 100 each incorporating an aperture 110 of the present invention. Tape library system 300 further includes a tape cartridge elevator 314, at least one tape cartridge elevator guide shaft 316, a roller drive shaft 318, a rack drive shaft 320, a tape cartridge elevator motor 322, a pulley drive assembly 324, a roller drive shaft motor 326, and a rack drive shaft motor 330.

Additionally, tape cartridge library system 300 includes a first embodiment of cartridge gripping assembly 200. Tape cartridge elevator 314 is positioned within housing 302 between tape drives 308 and tape cartridge magazines 310. In adapting cartridge elevator 314 for use with the present invention, a ridable block 325 is mounted on elevator 314.

Figure 12:
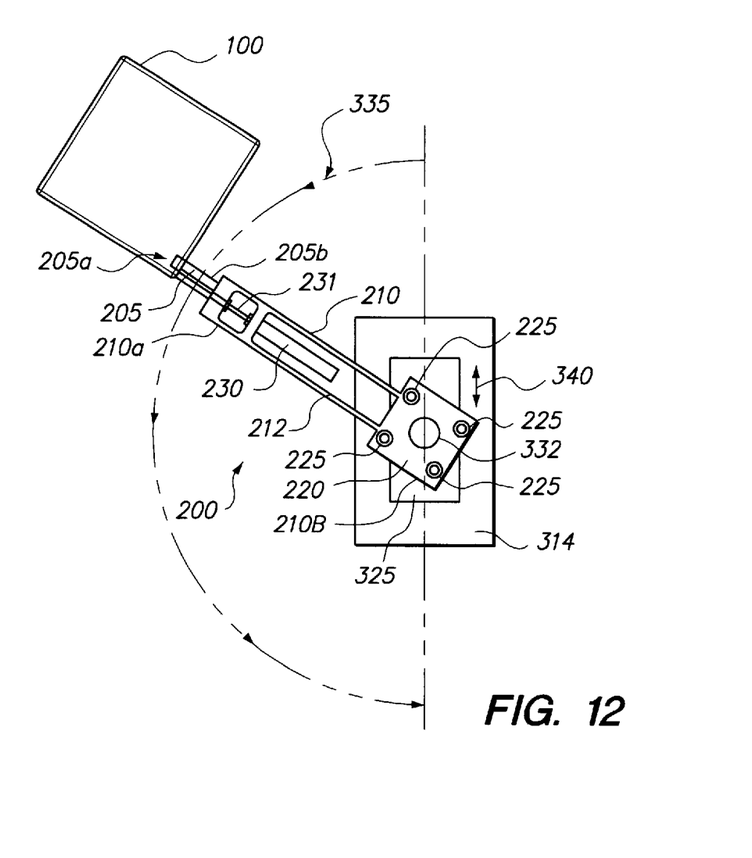
FIG. 12 illustrates a top plan view of the tape cartridge elevator employed within the FIG. 11 tape library system.

Additionally, robotic arm 210 is rotatably mounted on slidable block 325 via pivotable member 332. As a result and as illustrated in FIG. 12, robotic arm 210 rotates about slidable block 325 as indicated by arrows 335 and slidable block 325 slides back and forth as indicated by arrows 340. Rotation of robotic arm 210 and sliding of slidable block 325 is controlled by a conventional robotic arm motor and controller circuit positioned on elevator 320 (FIG. 11). Tape cartridge elevator 320 is actuated in the directions indicated by arrow 345 by tape cartridge elevator motor 322 and pulley assembly 324 under the control of tape cartridge loader controller 306 and library controller 307.

To move a selected cartridge 100 from a tape cartridge magazine slot 312 to a selected tape drive 308, elevator 320 is moved to a position adjacent to desired tape cartridge 100. Slidable block 325 is actuated to position first end 205a of cartridge gripping mechanism 205 within aperture 110 in cartridge 100, whereupon gripping mechanism 205 is actuated to engage cartridge 100 as previously described. Thereafter slidable block 325 is reversed to extract cartridge 100 from magazine slot 312. As shown in FIG. 11, robotic arm 210 is then rotated to align tape cartridge 100 with tape drives 308. Elevator 320 is then vertically adjusted to further align cartridge 100 with a tape drive slot 350 associated with a selected tape drive 308. Slidable block 325 is then actuated to insert cartridge 100 into the selected tape drive 308 and cartridge gripping mechanism 205 is again actuated to disengage cartridge 100 from cartridge gripping assembly 200.

The above described storage medium cartridge gripping assembly 200 and storage medium cartridge 100 adapted to cooperate therewith has many advantages over the prior art, including providing a universal cartridge gripper assembly 200 that can engage a number of differently shaped storage medium cartridges 100, as long as each cartridge has an aperture 110.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A cartridge gripping assembly for moving a cartridge, the cartridge having an aperture with an inner circumferential wall, the cartridge gripping assembly comprising:

a gripping mechanism that extends into the aperture in the cartridge and engages the inner circumferential wall of the aperture of the cartridge, the gripping mechanism including a first component, a second component and an actuation means that moves the second component relative to the first component; wherein the movement of the second component relative to the first component in a first direction causes a height of the gripping mechanism to increase and movement of the second component relative to the first component in a second direction causes the height of the gripping mechanism to decrease; and a robotic arm for moving the gripping mechanism and the cartridge.

2. The cartridge gripping assembly of claim 1 wherein at least one of the components includes a ramped portion so that movement of the second component relative to the first component in the first direction causes the height of the gripping mechanism to change.

3. A storage medium cartridge gripping assembly for gripping a cartridge, the cartridge including an aperture that has an inner circumferential wall, the cartridge gripping assembly comprising:

a gripping mechanism including a first end that extends into the aperture, the first end including a first ramped portion and an adjacent second ramped portion; and a robotic arm coupled to the gripping mechanism, the robotic arm including an actuation means that selectively moves one of the ramped portions relative to the other ramped portion so that the first end moves between a contracted position that allows the first end to move into the aperture and an expanded position that causes the first end to engage the inner circumferential wall of the aperture to grip the cartridge.

4. The storage medium cartridge gripping assembly of claim 3 wherein the gripping mechanism has a longitudinal axis, and the first ramped portion has a predetermined width, the first ramped portion being inclined at a predetermined angle from the longitudinal axis, and the second ramped portion having a narrower width than the first ramped portion, and a pair of longitudinal grooves formed at an intersection of the first and second ramped portions.

5. The storage medium cartridge gripping assembly of claim 3 wherein movement of the first ramped portion relative to the second ramped portion in a first direction causes a height of the first end to increase, and wherein movement of the first ramped portion relative to the second ramped portion in a second direction causes the height of the first end to decrease.

6. The storage medium cartridge gripping assembly of claim 3, wherein the gripping mechanism further includes (i) a central arm having a first end and a second end, (ii) a slide component coupled with the first end of the central arm via a hinge, the slide component having a ramped interior portion, and (iii) a pair of rails defined on longitudinal edges of the ramped interior portion, the pair of rails slidably engaging the pair of longitudinal grooves for enabling the slide component to slide up and down the first and second ramped portions.

7. The storage medium cartridge gripping assembly of claim 3 wherein the cartridge includes a support ring secured to the inner circumferential wall of the aperture, the gripping mechanism engaging the support ring to grip the cartridge.

8. The storage medium cartridge gripping assembly of claim 3 wherein the gripping mechanism includes a pin, and wherein the actuation means causes the pin to extend into the inner circumferential wall of the aperture to grip the cartridge when the first end is in the expanded position.

9. The storage medium cartridge gripping assembly of claim 8 wherein the pin is spring loaded.

10. The storage medium cartridge gripping assembly of claim 8 wherein the pin extends generally in a direction that is perpendicular to a longitudinal axis of the robotic arm.

11. A cartridge gripping assembly for gripping a cartridge, the cartridge including an aperture that has an inner circumferential wall, the cartridge gripping assembly comprising:

a gripping mechanism including a first end that extends into the aperture, the first end including a first ramped portion and an adjacent second ramped portion;

a robotic arm coupled to the gripping mechanism, the robotic arm selectively causing the ramped portions to move relative to each other to expand the first end against the inner circumferential wall when the first end is extended into the aperture so that the first end grips the cartridge when the first end is expanded.

12. The storage medium cartridge gripping assembly of claim 11 wherein the gripping mechanism has a longitudinal axis, and the first ramped portion has a predetermined width, the first ramped portion being inclined at a predetermined angle from the longitudinal axis, and the second ramped portion having a narrower width than the first ramped portion, and a pair of longitudinal grooves formed at an intersection of the first and second ramped portions.

13. The cartidge gripping assembly of claim 12, wherein the gripping mechanism further includes:
 a central arm having a first end and a second end;
 a slide component coupled with the first end of the central arm via a hinge, the slide component having a ramped interior portion; and
 a pair of rails defined on longitudinal edges of the ramped interior portion,
 wherein the pair of rails slidably engages the pair of longitudinal grooves for enabling the slide component to slide, up and down the first and second ramped portions.

14. The storage medium cartridge gripping assembly of claim 13, wherein the second ramped portion further includes:
 a central collet having a predetermined diameter and depth;
 a bottom region of the collet having a central bore that extends through the gripping mechanism, the central bore having a smaller diameter than the collet so that a ridge is formed between the bottom region of the collet and the central bore;
 a spring loaded pin positioned in the collet so that one end of the spring rests on the ridge and another end of the spring preloads a first end of the pin, the first end of the pin protruding above a planar surface of the second ramped portion; and
 a second end of the pin being positioned in the central bore, wherein the slide component engages the first end of the pin for depressing the first end of the pin flush with the second ramped portion, thereby compressing the spring to force the second end of the pin to extend outwardly from the gripping mechanism.

15. This storage medium cartridge gripping assembly of claim 14, wherein the second end of the pin engages a receptive bore formed on the inner wall of the aperture in the cartridge for securing the cartridge to the gripping mechanism.

16. The storage medium cartridge gripping assembly of claim 13, wherein the gripping mechanism further includes an actuation means coupled to the second end of the central arm via a hinge.

17. The storage medium cartridge gripping assembly of claim 16, wherein the actuation means comprises a pneumatic air plunger, the air plunger being coupled with the second end of the central arm via the hinge, the air plunger cooperating with a pneumatic air cylinder positioned in close proximity to the plunger for actuating the plunger to move the central arm along the longitudinal axis.

18. The storage medium cartridge gripping assembly of claim 16, wherein the actuation means is a solenoid.

19. A cartridge gripping assembly for gripping a cartridge, the cartridge including an aperture that has an inner circumferential wall, the cartridge gripping assembly comprising:
 a gripping mechanism including a first end that extends into the aperture, the first end having a first component and a second component that cooperate to engage the cartridge at the aperture in the cartridge;
 an actuation means that moves the second component relative to the first component, wherein movement of the second component relative to the first component in a first direction causes a height of the gripping mechanism to increase and movement of the second component relative to the first component in a second direction causes the height of the gripping mechanism to decrease; and
 a robotic arm coupled to the gripping mechanism, the robotic arm selectively expanding the first end against the inner circumferential wall when the first end is extended into the aperture so that the first end grips the cartridge when the first end is expanded.

20. The cartridge gripping assembly of claim 19 wherein at least one of the components includes a ramped portion so that movement of the second component relative to the first component causes the height of the gripping mechanism to change.

21. A cartridge gripping assembly for gripping a cartridge, the cartridge including an aperture that has an inner circumferential wall, the cartridge gripping assembly comprising:
 a gripping mechanism including a first end that extends into the aperture, the gripping mechanism including a first component, a second component and an actuation means that moves the second component relative to the first component; wherein movement of the second component relative to the first component in a first direction causes a height of the gripping mechanism to increase and movement of the second component relative to the first component in a second direction causes the height of the gripping mechanism to decrease; and
 a robotic arm coupled to the gripping mechanism, the robotic arm selectively expanding the first end against the inner circumferential wall when the first end is extended into the aperture so that the first end grips the cartridge when the first end is expanded.

22. The storage medium cartridge gripping assembly of claim 21 wherein at least one of the components includes a ramped portion.

23. The storage medium cartridge gripping assembly of claim 21 wherein each of the components includes a ramped portion.

24. A cartridge gripping assembly for gripping a cartridge, the cartridge including an aperture that has an inner circumferential wall, the cartridge gripping assembly comprising:
 a first end that extends into the aperture, the first end having a first component and a second component that slidingly move relative to each other to expand the first end, at least one of the components including a ramped portion so that movement of the second component relative to the first component causes the height of the first end to change; and
 an actuation means that moves the second component relative to the first component to expand the first end against the inner circumferential wall when the first end is extended into the aperture so that the first end grips the cartridge.

25. A cartridge gripping assembly for gripping a cartridge, the cartridge including an aperture that has an inner circumferential wall, the cartridge gripping assembly comprising:
 a first end that extends into the aperture, the first end having a first component and a second component that slidingly move relative to each other to expand the first end so that movement of the first component relative to the second component in a first direction causes a height of the first end to increase, and movement of the first component relative to the second component in a second direction causes the height of the first end to decrease; and an actuation means that moves the second component relative to the first component to expand the first end against the inner circumferential wall when the first end is extended into the aperture so that the first end grips the cartridge.

26. The cartridge gripping assembly of claim 25 wherein the aperture is substantially oval shaped.

27. The cartridge gripping assembly of claim 25 wherein the cartridge includes a support ring secured to the inner circumferential wall of the aperture, the first end engaging the support ring to grip the cartridge.

28. The cartridge gripping assembly of claim 25 wherein the actuation means is a solenoid.

29. The cartridge gripping assembly of claim 25 further including a means for moving the first end relative to the cartridge, the means for moving being coupled to the first end.

30. The cartridge gripping assembly of claim 29 wherein the means for moving includes a robotic arm.

31. The cartridge gripping assembly of claim 30 further comprising a pivotal member that is coupled to and pivots the robotic arm relative to the cartridge.

32. The cartridge gripping assembly of claim 25 wherein each of the components includes a ramped portion.

33. A cartridge gripping assembly for gripping a cartridge, the cartridge including an aperture that has an inner circumferential wall, the cartridge gripping assembly comprising:

a first end that extends into the aperture, the first end having a first component and a second component that slidingly move relative to each other to expand the first end;

a pin; and an actuation means that moves the second component relative to the first component to expand the first end against the inner circumferential wall when the first end is extended into the aperture so that the first end grips the cartridge, the actuation means causing the pin to extend into the inner circumferential wall of the aperture to grip the cartridge when the first end is expanded.

34. The cartridge gripping assembly of claim 33 wherein the pin is spring loaded.

35. The cartridge gripping assembly of claim 33 wherein the actuation means has a longitudinal axis, and wherein the pin extends in a direction that is substantially perpendicular to the longitudinal axis of the actuation means.

* * * * *

UNITED STATES PATENT AND TRADEMARK OFFICE
CERTIFICATE OF CORRECTION

PATENT NO.     : 6,729,825 B1
DATED          : May 4, 2004
INVENTOR(S)    : Saliba et al.

It is certified that error appears in the above-identified patent and that said Letters Patent is hereby corrected as shown below:

Column 6,
Line 67, please delete "reliable" and substitute therefore -- slidable --.

Column 9,
Line 19, please delete "," after the word "slide".

Signed and Sealed this

Third Day of August, 2004

JON W. DUDAS
*Acting Director of the United States Patent and Trademark Office*